C. H. PELTON.
HAY LOADER.
APPLICATION FILED FEB. 7, 1918.
1,319,724.
Patented Oct. 28, 1919.
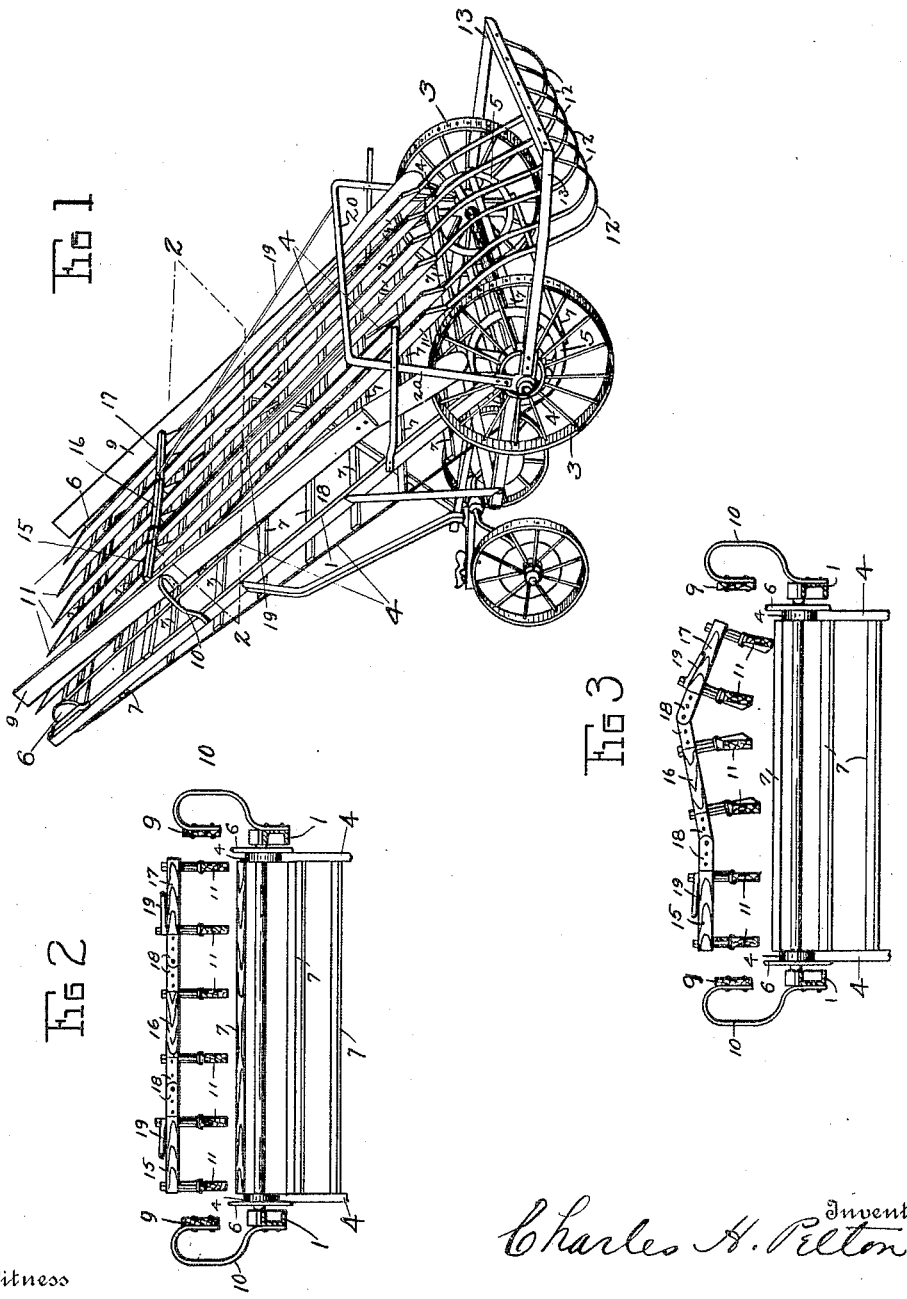

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

HAY-LOADER.

1,319,724.      Specification of Letters Patent.      Patented Oct. 28, 1919.

Application filed February 7, 1918. Serial No. 215,794.

*To all whom it may concern:*

Be it known that I, CHARLES H. PELTON, a citizen of the United States, residing at Springfield, in the county of Clark and State of Ohio, have invented certain new and useful Improvements in Hay-Loaders, of which the following is a specification.

This invention relates to improvements in hay loaders, it particularly relating to that part of a hay loader known as the "float," which is for the purpose of retaining the hay on the endless carrier or elevator during its upward travel.

The object of the invention is to construct the float in a manner to enable it to self-adjust itself to the different thicknesses of the hay so as to permit it to perform its function in a way which will cause the hay to travel uniformly up the elevator and obviate bunching or falling back of the hay upon the elevator.

In the accompanying drawings:—

Figure 1 is a perspective view of so much of a hay loader as is necessary to illustrate my improvement.

Fig. 2 is a section on the line 2—2 of Fig. 1.

Fig. 3 is a similar section but showing the parts in the position assumed caused by an uneven thickness of the material being elevated.

Referring to the drawings, 1 represents the inclined frame which supports the endless carrier or elevator and the float, this inclined frame being mounted upon and suitably supported in the usual way by a truck which is carried by the ground or supporting wheels 3. The carrier is of the usual construction consisting of endless chains 4 which pass about the sprocket wheels 5 rotatably connected with the axle of the rear carrying wheels and passing over the sheaves 6 at the upper end of the frame, the chains being connected in the usual way by the cross bars or slats 7 which are in turn connected by a series of endless ropes (not shown). As is common in structures of this character, there are provided side boards 9 supported by spring arms 10 to prevent the lateral displacement of the material being elevated.

The float consists of a series of wooden bars 11 which extend upwardly above the carrier with their upper ends normally resting upon the carrier and their lower ends connected to a series of flat spring-steel strips 12 which are connected to and supported by the usual rearwardly extending frame portion 13. The rear portion of these spring steel strips are formed on the arc of a circle as shown to accommodate a rake cylinder (not shown in the present case) which is supported by the frame 13, the teeth of this cylinder revolving between the strips 12 so as to rake the hay up to a position where it may be engaged by the teeth of another rake cylinder (not shown) which revolves with the axle of the rear carrying wheels 3 so that the hay will be deposited in a well known way upon the endless carrier beneath the lower ends of the bars 11 of the float.

It has been usual to connect the bars 11, near the upper end thereof by a cross-piece for the purpose of maintaining the bars in proper spaced lateral relation relatively each other, this cross piece having heretofore been of a rigid character which rigidly connects the upper ends of all the bars together. As a result of this construction, difficulty has been experienced in maintaining the float bars in proper relation to the carrier, for, in the event of a large bunch of hay traveling up one side or at the center of the carrier, the result is that when that bunch of hay passes under the connecting strip the entire float across the entire width of the carrier is raised up with the consequence that the float will fail to properly perform its function of holding the hay to the carrier until the bunch or undue thickness of hay has passed beneath the strip.

In order to overcome this difficulty, which is the gist of my invention, I provide a connecting cross-piece which is flexible or yielding in character so that the float bars may rise up independently of each other. In the present case I provide a cross connecting strip in three sections, 15, 16 and 17, hinged together by metallic straps 18, each section having connected therewith two of the float bars 11, as in the present case six of these float bars are employed. As a result of this arrangement, it will be seen, by referring to Fig. 3, that the float bars 11 may move upwardly under pressure of an undue increased thickness of hay independently of each other so that the bars may adjust themselves across the entire width of the carrier to the thickness of the material so as to maintain the material at all times in proper contact with the carrier.

In order to relieve the strips 12 from the weight of the bars of the float, I provide two brace rods 19 extending from the sections 15 and 17 of the cross connecting strip to an arch 20 suitably supported from the frame of the machine.

Having thus described my invention, I claim:—

1. In a device of the character described, an elevator, a float for said elevator for retaining the material thereon consisting of a series of parallel bars, means for yieldably supporting the lower ends of said bars, and a cross-strip for connecting the upper ends of said bars to maintain said bars in spaced relation, said cross-strip being formed in hinged sections, for the purpose specified.

2. In a device of the character described, an elevator, a retaining device for the material being elevated comprising a series of bars, a flexible connection for the lower end of each of said bars, a connection across the said bars for maintaining them in spaced relation, and braces connected with said bars to relieve the weight of the same from said lower flexible connections.

3. In a device of the character described, an elevator, a retaining device for the material being elevated thereon consisting of a series of independently movable members, yielding means for supporting the lower ends of said members, a flexible connecting device for spacing the upper ends of said members, and braces connected with said flexible connecting device, for the purpose specified.

4. In a device of the character described, an elevator, a float for said elevator for retaining the material thereon consisting of a series of parallel bars, means for yieldably supporting the lower ends of said bars, and a cross-strip for connecting the upper ends of said bars to maintain said bars in spaced relation, said cross-strip being formed in hinged sections, and braces connected to said cross-strip.

In testimony whereof, I have hereunto set my hand this first day of February 1918.

CHARLES H. PELTON.

Witness:
CHAS. I. WELCH.

Copies of this patent may be obtained for five cents each, by addressing the "Commissioner of Patents, Washington, D. C."